US010315532B2

(12) United States Patent
Vikstrom et al.

(10) Patent No.: US 10,315,532 B2
(45) Date of Patent: Jun. 11, 2019

(54) MONOPOST FOR FREE-STANDING VEHICLE SEAT

(71) Applicant: Tesla, Inc., Palo Alto, CA (US)

(72) Inventors: P Thomas Vikstrom, Belmont, CA (US); Jan Just, San Francisco, CA (US); Olav Sadoo, San Jose, CA (US); Anthony Paschos, Fremont, CA (US); Hussein Sanaknaki, Sunnyvale, CA (US); Wayne Watson, Port Melbourne (AU); Jason Daddy, Port Melbourne (AU)

(73) Assignee: TESLA, INC., Palo Alto, CA (US)

( * ) Notice: Subject to any disclaimer, the term of this patent is extended or adjusted under 35 U.S.C. 154(b) by 12 days.

(21) Appl. No.: 15/612,600

(22) Filed: Jun. 2, 2017

(65) Prior Publication Data

US 2017/0267123 A1 Sep. 21, 2017

Related U.S. Application Data

(63) Continuation of application No. 14/838,157, filed on Aug. 27, 2015, now Pat. No. 9,669,734.

(51) Int. Cl.
*B60N 2/005* (2006.01)
*B60N 2/12* (2006.01)
(Continued)

(52) U.S. Cl.
CPC ............ *B60N 2/005* (2013.01); *B60N 2/065* (2013.01); *B60N 2/067* (2013.01); *B60N 2/0705* (2013.01);
(Continued)

(58) Field of Classification Search
CPC .... B60N 2/005; B60N 2/0705; B60N 2/0715; B60N 2/68; B60N 2/065; B60N 2/067; B60N 2/12
(Continued)

(56) References Cited

U.S. PATENT DOCUMENTS

| 872,247 A | 11/1907 | Moss |
| 2,864,431 A * | 12/1958 | Eaton ..................... B60N 2/067 248/393 |

(Continued)

FOREIGN PATENT DOCUMENTS

| DE | 9011025 U1 | 10/1990 |
| EP | 1762423 A3 | 8/2006 |

(Continued)

OTHER PUBLICATIONS

International Searching Authority; International Search Report and Written Opinion; International Application No. PCT/US2016/049014; dated Nov. 14, 2016; 10 pgs.

(Continued)

*Primary Examiner* — Jason S Morrow
*Assistant Examiner* — E Turner Hicks
(74) *Attorney, Agent, or Firm* — Garlick & Markison; Bruce E. Garlick

(57) ABSTRACT

A monopost for a free-standing seat of a vehicle comprises: an inner subassembly of first clamshell components attached to each other; an outer subassembly of second clamshell components attached to each other around the inner subassembly, the outer subassembly forming a wing portion at one end; and a wing clamshell attached to the first clamshell components and to the wing portion.

24 Claims, 16 Drawing Sheets

(51) Int. Cl.
  *B60N 2/68* (2006.01)
  *B60N 2/06* (2006.01)
  *B60N 2/07* (2006.01)

(52) U.S. Cl.
  CPC ............. *B60N 2/0715* (2013.01); *B60N 2/12* (2013.01); *B60N 2/68* (2013.01)

(58) Field of Classification Search
  USPC .......................... 296/65.13, 65.03, 63, 65.08
  See application file for complete search history.

(56) References Cited

U.S. PATENT DOCUMENTS

| | | |
|---|---|---|
| 3,741,513 A | 6/1973 | Wilson |
| 4,014,507 A * | 3/1977 | Swenson ............... B60N 2/143 248/354.1 |
| 4,241,893 A * | 12/1980 | Koutsky .................. B60N 2/06 248/425 |
| 4,533,110 A | 8/1985 | Hill |
| 4,955,575 A | 9/1990 | Moore |
| 5,890,768 A * | 4/1999 | Beurteaux ............... B63B 29/06 244/122 R |
| 6,637,712 B1 | 10/2003 | Lagerweij |
| 6,799,805 B2 | 10/2004 | Johnson |
| 7,635,323 B2 | 12/2009 | Halbridge |
| 7,731,296 B2 | 6/2010 | Tsuda et al. |
| 8,002,350 B2 | 8/2011 | Johnson |
| D673,393 S | 1/2013 | von Holzhausen et al. |
| 9,688,164 B2 * | 6/2017 | Vikstrom ............. B60N 2/0292 |
| 2009/0017999 A1 | 1/2009 | Halbridge |
| 2009/0212190 A1 | 8/2009 | Dahlbacka et al. |
| 2011/0109114 A1 | 5/2011 | Kolpasky et al. |
| 2012/0161429 A1 | 6/2012 | Rawlinson et al. |
| 2014/0167467 A1 | 6/2014 | Petermann et al. |

FOREIGN PATENT DOCUMENTS

| | | |
|---|---|---|
| EP | 2322377 | 5/2011 |
| EP | 2610104 A2 | 7/2013 |
| FR | 2285259 A1 | 4/1976 |
| WO | 2012134418 A1 | 10/2012 |

OTHER PUBLICATIONS

Extended European Search Report; EP Application No. 168402141; dated Mar. 27, 2019; 8 pages.

* cited by examiner

MONOPOST FOR FREE-STANDING VEHICLE SEAT

CROSS REFERENCE TO RELATED APPLICATIONS

The present U.S. Utility Patent Application claims priority pursuant to 35 U.S.C. § 120 as a continuation of U.S. Utility application Ser. No. 14/838,157 entitled "MONOPOST FOR FREE-STANDING VEHICLE SEAT", filed Aug. 27, 2015, which is hereby incorporated herein by reference in its entirety and made part of the present U.S. Utility Patent Application for all purposes.

BACKGROUND

Vehicles that offer additional seating for adults beyond the four or five seats of a traditional family car are becoming increasingly popular. For example, minivans, cross-overs and sport utility vehicles can provide more seating than a traditional sedan or station wagon. In some vehicle types, the additional seating is furnished by way of a third row of seats positioned behind the regular second-row seats that are traditionally considered the "back" or "rear" seats. However, the third-row seats are typically more difficult to get into and out of because of their placement relative to the vehicle's doors.

SUMMARY

In a first aspect, a monopost for a free-standing seat of a vehicle comprises: an inner subassembly of first clamshell components attached to each other; an outer subassembly of second clamshell components attached to each other around the inner subassembly, the outer subassembly forming a wing portion at one end; and a wing clamshell attached to the first clamshell components and to the wing portion.

Implementations can include any or all of the following features. The inner subassembly forms a first load transfer lobe between the first clamshell components. The outer subassembly forms a second load transfer lobe between at least one of the second clamshell components and the inner subassembly. Each of the first clamshell components comprises a substantially vertical portion and a substantially horizontal portion extending at a lower end of the substantially vertical portion. Each of the second clamshell components has its lower end attached to a respective one of the substantially horizontal portions.

Implementations can include any or all of the following features. The monopost further comprises: a keel attached to the inner and outer subassemblies at one end thereof, the keel having a base configured for load transfer; and a catcher plate configured for attachment to a frame of the vehicle to receive the load transfer from the base, the catcher plate having a slot for the keel to allow movement of the free-standing seat fore and aft in the vehicle, wherein the base is positioned on an opposite side of the catcher plate from the inner and outer subassemblies. The monopost further comprises a spreader that connects the monopost to respective tracks for the movement of the free-standing seat, wherein the spreader passes through an opening in the keel. The monopost further comprises a member positioned underneath the catcher plate, the member configured to fit a space between cross members of a vehicle floor. The monopost further comprises another keel attached to the inner and outer subassemblies at an opposite end thereof, the other keel configured to ride on top of the catcher plate during the movement of the free-standing seat fore and aft. The monopost further comprises a spreader that connects the monopost to respective tracks for the movement of the free-standing seat, wherein the other keel rests on the spreader. The monopost further comprises front and rear spreaders that connect the monopost to respective tracks for the movement of the free-standing seat, wherein the first clamshell components are attached to the spreaders.

Implementations can include any or all of the following features. The monopost further comprises a strut pivotally attached to the monopost, the strut configured for supporting a seat frame for pivoting relative to the monopost. The monopost further comprises a clevis at a proximate end of the strut, the clevis providing the pivotal attachment to the monopost, the clevis configured to bear on a structure of the monopost to transfer load into the vehicle. The structure comprises a block configured to assume at least first and second positions. In the first position the block prevents forward pivoting of the seat frame, and wherein in the second position the block allows forward pivoting of the seat frame. The block is positioned between plates attached to the monopost inside the inner subassembly. The strut has a lead screw for adjusting a pitch of the seat frame. The monopost further comprises a belt drive arranged to advance and retract the lead screw.

The wing portion and the wing clamshell form a wing at an upper end of the monopost, the monopost further comprising towers at respective ends of the wing, the towers configured for attaching a seat frame to the monopost. Each tower comprises a member that extends from above the wing, enters through an opening in the wing clamshell, continues through the wing, and at least partially extends through an opening in the wing portion. Each tower comprises a member attached across an end of the wing, the member having a return flange attached on an underside of the wing.

The first clamshell components have a flange that is sandwiched between the wing clamshell and the wing portion, and wherein the wing clamshell is attached to the first clamshell components by a three-layer attachment through the flange. The seat is configured for movement fore and aft in the vehicle, wherein the monopost travels fore and aft in a floor opening during the movement, the monopost further comprising a paneling system configured to substantially close the floor opening at each position of the monopost, the paneling system comprising at least a first panel fixed relative to the monopost, and a second panel that is adjustable relative to the first panel.

DETAILED DESCRIPTION

This document describes examples of systems and techniques for providing a monopost structure to carry the frame of a free-standing seat in a vehicle. This can provide a flexible and mass efficient way of supporting a seat on a single post from the vehicle floor in an elegant and structurally sound way, while permitting use of a track system for movement and/or a pivot mechanism for adjusting the seat pitch.

Examples illustrated herein show seat frames or parts thereof in order to describe the structures and mechanics that support the seat's construction and function. In an actual implementation, the seat is also provided with cushions and decorative panels, which are here omitted for clarity.

Figure 1:
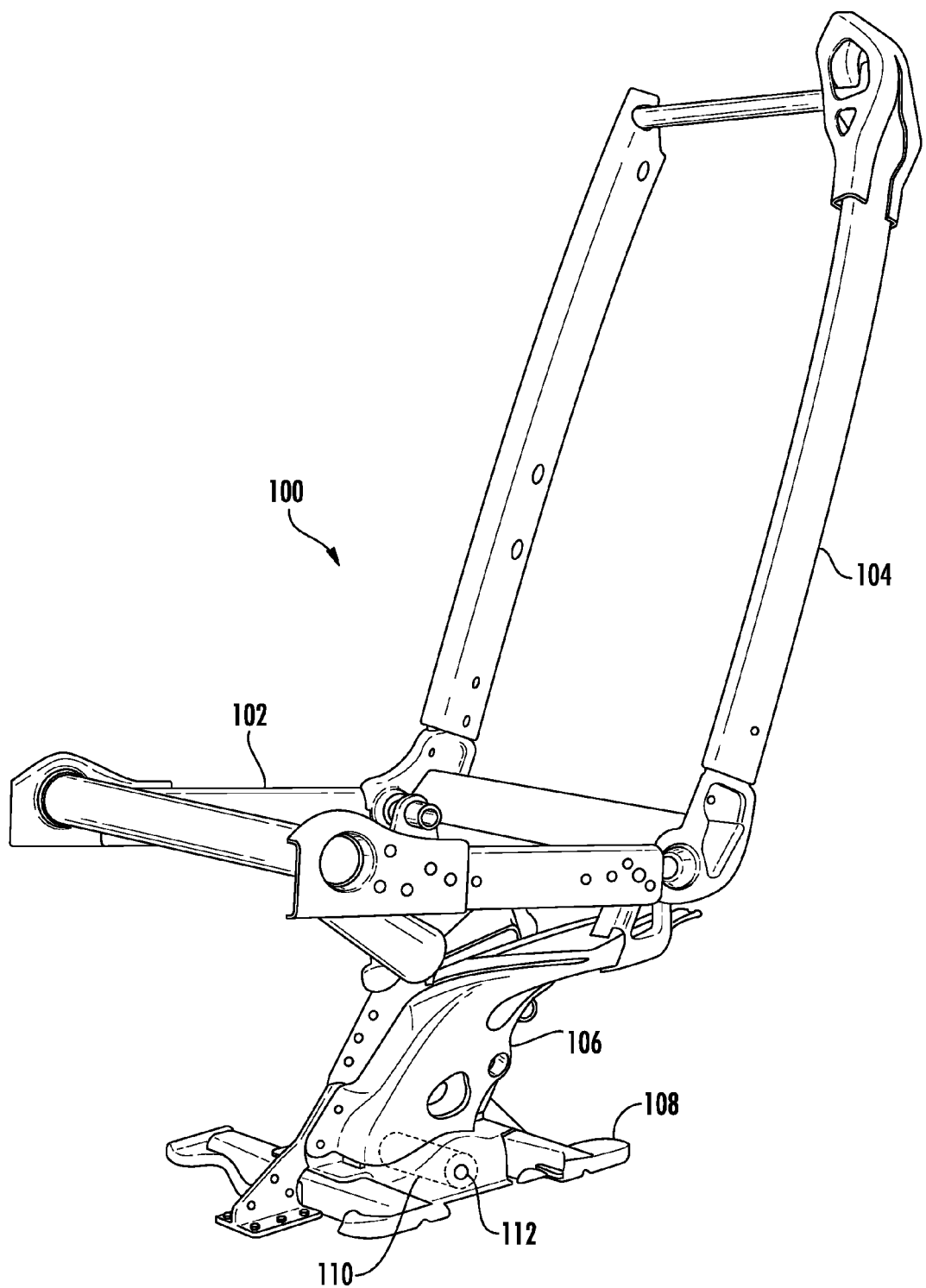
FIG. 1 shows an example of a frame structure for a freestanding seat.

FIG. 1 shows an example of a frame structure 100 for a freestanding seat. The structure includes a seat frame 102, a back frame 104, a monopost 106 and a spreader frame 108. In general terms, the spreader frame can serve to spread (i.e., broaden horizontally) the load from the seat above after it was brought down through the single structural post formed by the monopost. For example, some frame components are made of closed tubular sections, which can add torsional stiffness and packaging efficiency.

The monopost can be subjected to significant loads, especially when the seat is occupied and the vehicle experiences strong forces, such as during a collision. Part or all of the monopost can therefore be made of material(s) having significant yield and/or tensile strength, including, but not limited to, ultra-high strength steel. For example, the material selection can be made based on the resulting mass of the component, on its formability, and the optimization of joining techniques (e.g., welding).

In some implementations, some or all of the monopost are formed while the material is at a very high temperature and therefore has significant formability. For example, a hot stamping technique can be used, wherein the material is formed (while very hot) and quenched at the same time so as to form martensite. For example, other materials may not be able to transfer sufficient loads for this intended use, and/or may not fit within an envelope defined for the construction, and/or may be too heavy. Also, or instead, the monopost can have reinforcement structures inside it that add to its structural integrity.

A motor 110 is positioned inside the monopost and is here illustrated in phantom. The motor actuates a drive shaft 112 (e.g., a flexible shaft) so as to move the seat fore and aft relative to a track assembly (e.g., in FIG. 2). For example, the drive shaft can extend outside the monopost on both sides thereof. An electric motor of suitable capacity (e.g., a brushless motor) can be used.

The frame structure 100 provides anchor points for a seat belt mounted on the seat. That is, the seat belt can be contained entirely on the seat so that the seat belt is not affected by fore/aft movement or pitching of the seat. Here, an upper anchor point is provided by a bracket on the back frame 104. Other seat belt anchor points can be provided on the seat frame 102.

Figure 2:
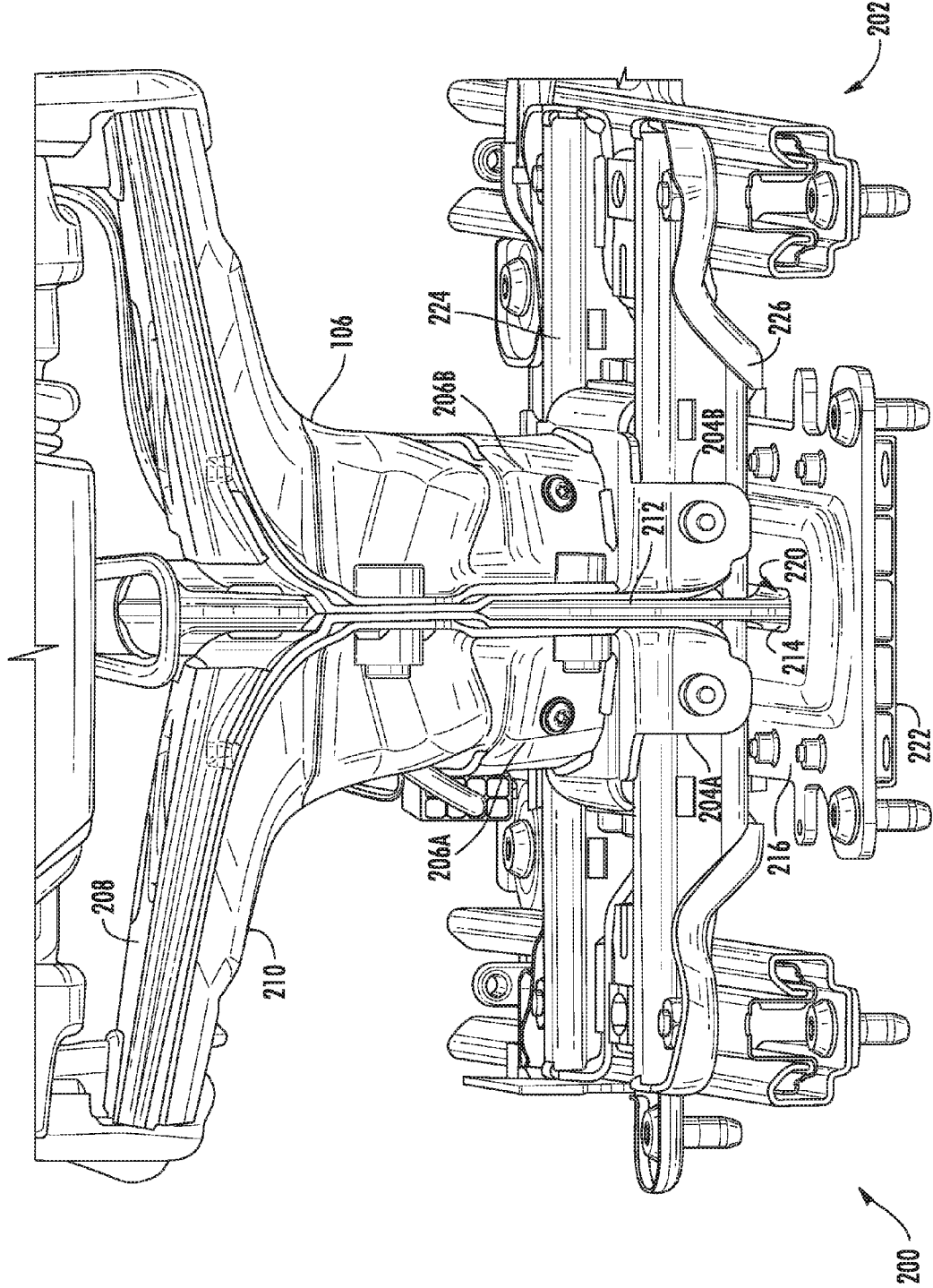
FIG. 2 shows a perspective view of a lower seat structure.

FIG. 2 shows a perspective view of a lower seat structure 200. The lower seat structure has the monopost 106, and the spreader frame 108 is joined to a track assembly 202. The track assembly here includes a pair of seat tracks and is configured to be attached to the vehicle floor to facilitate fore/aft movement of the seat. This monopost can serve to transfer crash loads from the seat above, which enables the seat to be free standing (e.g., to have the seat belt anchored solely on the seat frame and not directly to any part of the vehicle frame).

The monopost here includes clamshell components 204A-B that form an inner subassembly, and clamshell components 206A-B that form an outer subassembly. In some implementations, the clamshell components 204A-B are essentially mirror images of each other. In some implementations, the clamshell components 206A-B are essentially mirror images of each other.

On top of the subassemblies is mounted a wing clamshell 208. Here, each clamshell in the outer subassembly forms a wing portion 210 and the wing clamshell is attached to the respective wing portions, such as by spot welding, to form wings at the upper end of the monopost. The wings can be used as the attachment points for suspending the seat frame on the monopost. This can allow for a very mass efficient solution that meets the structural requirements for use as a vehicle seat. Moreover, the solution can provide the advantage of allowing sufficient flexibility to fit within a styling surface defined for the seat assembly.

The monopost has a keel 212 for transferring load from the seat into the vehicle frame. In some implementations the keel is attached to the inner and outer subassemblies (e.g., sandwiched between clamshell components thereof) at their rear end, and serves as a primary load path for the seat. For example, the keel can be a one-piece forging that is attached in several ways (e.g., by bolts and also by a through hole). The keel has a base 214 that is configured to provide the load transfer. For example, the base can bear against vehicle structure (e.g., a catcher plate) so as to transfer the load on the seat into other structure.

A catcher plate 216 is positioned generally below the monopost. The catcher plate is configured to be directly or indirectly attached to the vehicle frame for receiving the load transfer from the base. Also, the catcher plate has a slot 220 slot for the keel. For example, this allows movement of the seat fore and aft in the vehicle by providing a path for the keel to slide while the base remains constrained by the catcher plate.

A member 222 is here positioned below the catcher plate. The member can be attached to the same vehicle frame structure as the catcher plate (e.g., the floor) or to a separate structure. For example, the member can be formed by an extrusion process.

The lower seat structure here has spreaders 224 (e.g., cross members) that connect the monopost to the track assembly. For example, this allows the seat to be moved fore and aft by sliding along the tracks. Here, each of the spreaders has respective feet 226 that fit onto the shape of the particular track. The clamshell components 204A are here attached to the spreaders, which can provide another load transfer path, such as a secondary load path in addition to that of the catcher plate and keel. For example, the clamshell components 204A-B can have a portion toward their base that folds down on the spreader to partially enclose it.

Figure 3:
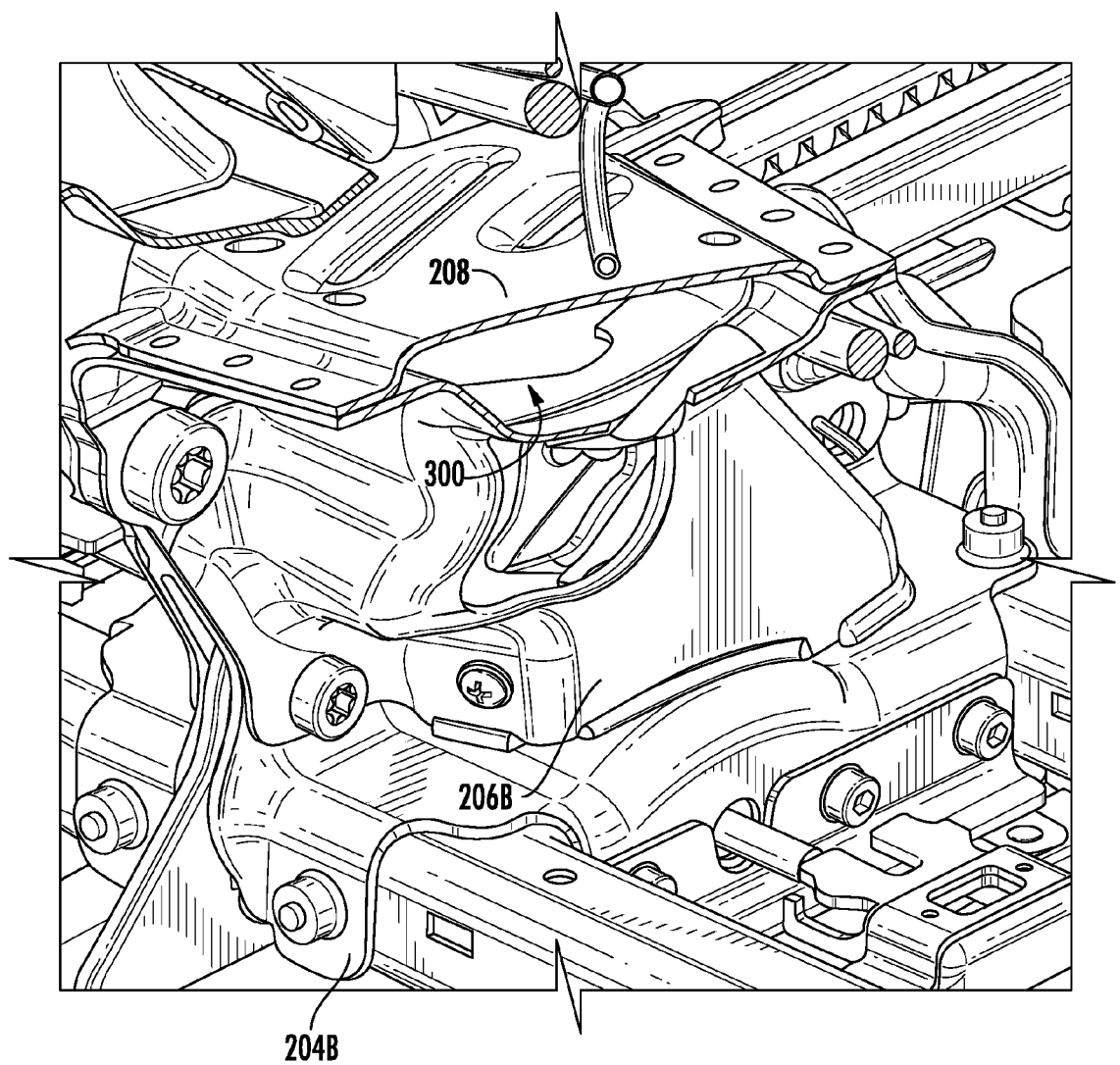
FIG. 3 shows a cross section of the wing in FIG. 2.

FIG. 3 shows a cross section of the wing in FIG. 2. That is, this view shows how the clamshell component 204B and the wing clamshell 208 together form the wing of the monopost. Moreover, the cross section shows that the profile of the wing is designed for strength and stiffness so as to effectively transfer loads from the frame into the monopost, such as in the event of a crash. For example, the wing clamshell and the clamshell component 204B forms a respective lobe 300 in each of the wings.

Figure 4:
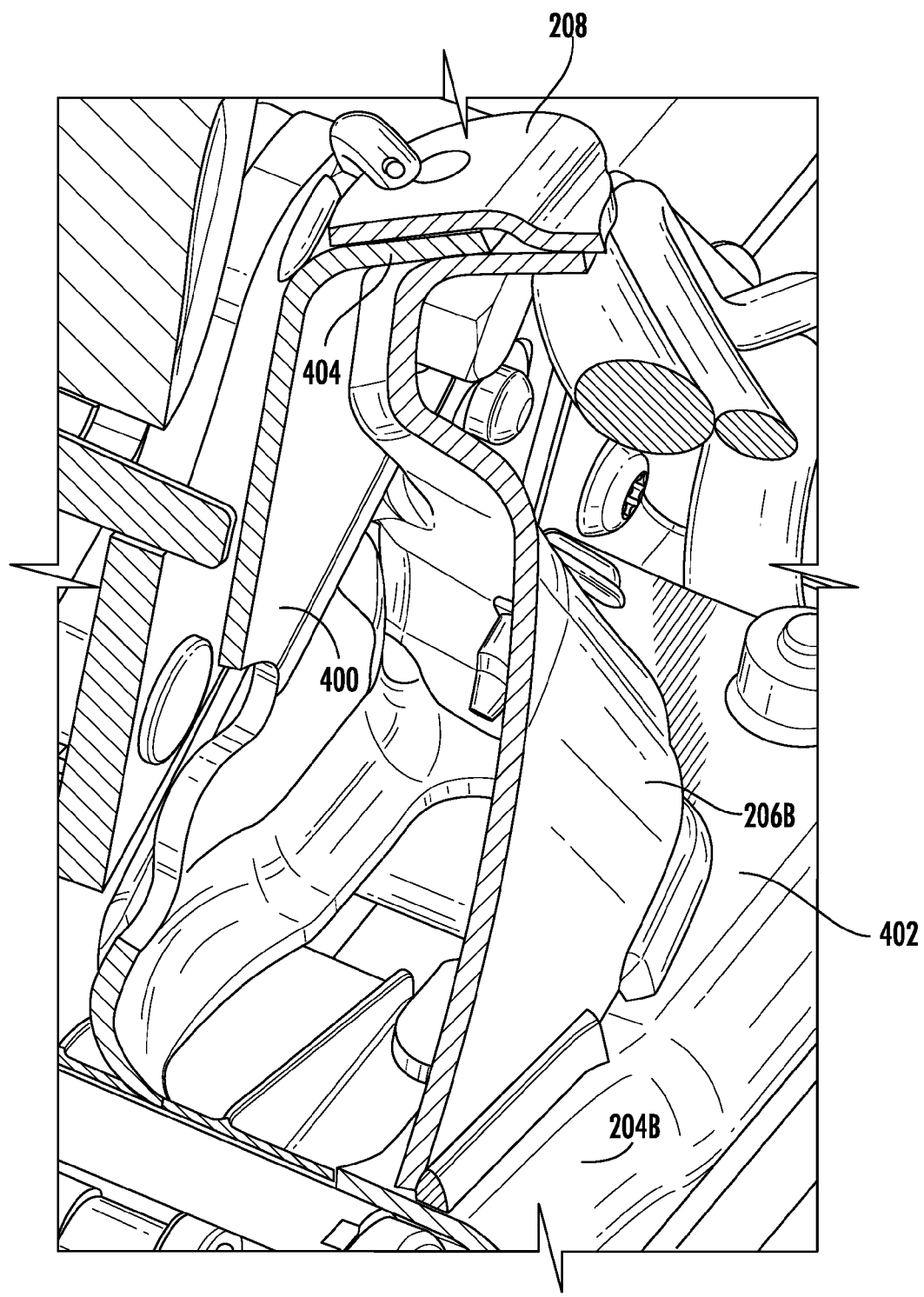
FIG. 4 shows a cross section through the clamshells of FIG. 3.

FIG. 4 shows a cross section through the clamshells of FIG. 3. That is, this view shows the clamshell component 206B of the outer subassembly being positioned onto the base of the clamshell component 204B of the inner subassembly. In some implementations, each of the clamshell components of the inner subassembly comprises a substantially vertical portion 400 and a substantially horizontal portion 402. The substantially horizontal portion extends outward at a lower end of the substantially vertical portion. The substantially vertical portion, in turn, extends up inside the outer subassembly. For example, each of the clamshell components of the outer subassembly has its lower end attached to a respective one of the substantially horizontal portions 402.

This view also shows an example of how the wing clamshell 208 can be attached to the respective subassemblies. In some implementations, the clamshell component 204B has a flange 404 toward its top that is used for the attachment. The flange can be sandwiched between the wing clamshell and the wing portion of the clamshell component 206B. For example, the wing clamshell is attached to the clamshell components 204B and 206B by a three-layer attachment (e.g., a 3T weld).

Figure 5:
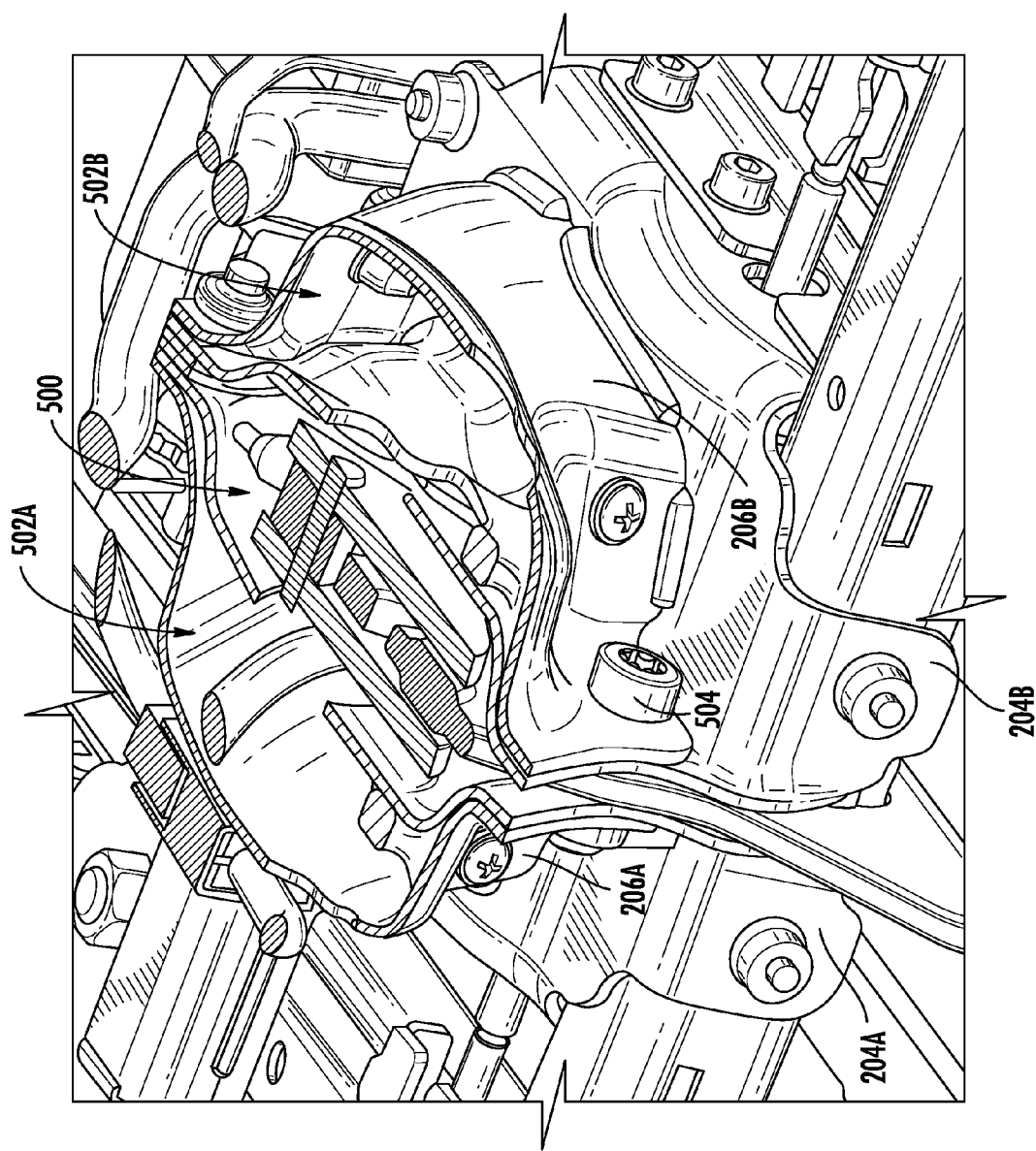
FIG. 5 shows another cross section through the clamshells.

FIG. 5 shows another cross section through the clamshells. This view shows that the clamshell components 204A-B of the inner subassembly form a load transfer lobe 500 between the first clamshell components. That is, the lobe 500 is defined by the respective portions of the inner subassembly that extend upward in the monopost. The clamshell components 206A-B of the outer subassembly, moreover, form a second load transfer lobe between at least one of the clamshell components 206A-B and the clamshell components 204A-B. For example, here respective load transfer lobes 502A and 502B are formed. While the profile of the lobes can change throughout the monopost, the lobes can extend for a longer or shorter distance. For example, the lobes 502A-B can gradually transition into a lobe in the wing of the monopost (e.g., the lobe 300 in FIG. 3).

Such arrangements provide that the loads (e.g., from a crash or other impact) are transferred from the seat frame through multiple lobes. In some implementations, the monopost defines three separate lobes 500 and 502A-B. For example, this approach can improve the design freedom for the seat as a whole and allow a structurally sufficient solution to be fit within a styling surface defined for this aspect of the vehicle. The clamshell components are attached to each other using suitable techniques. For instance, bolts and/or rivets can be used. Here, for example, a bolt 504 passes through both sets of clamshell components as well as the keel.

Figure 6:
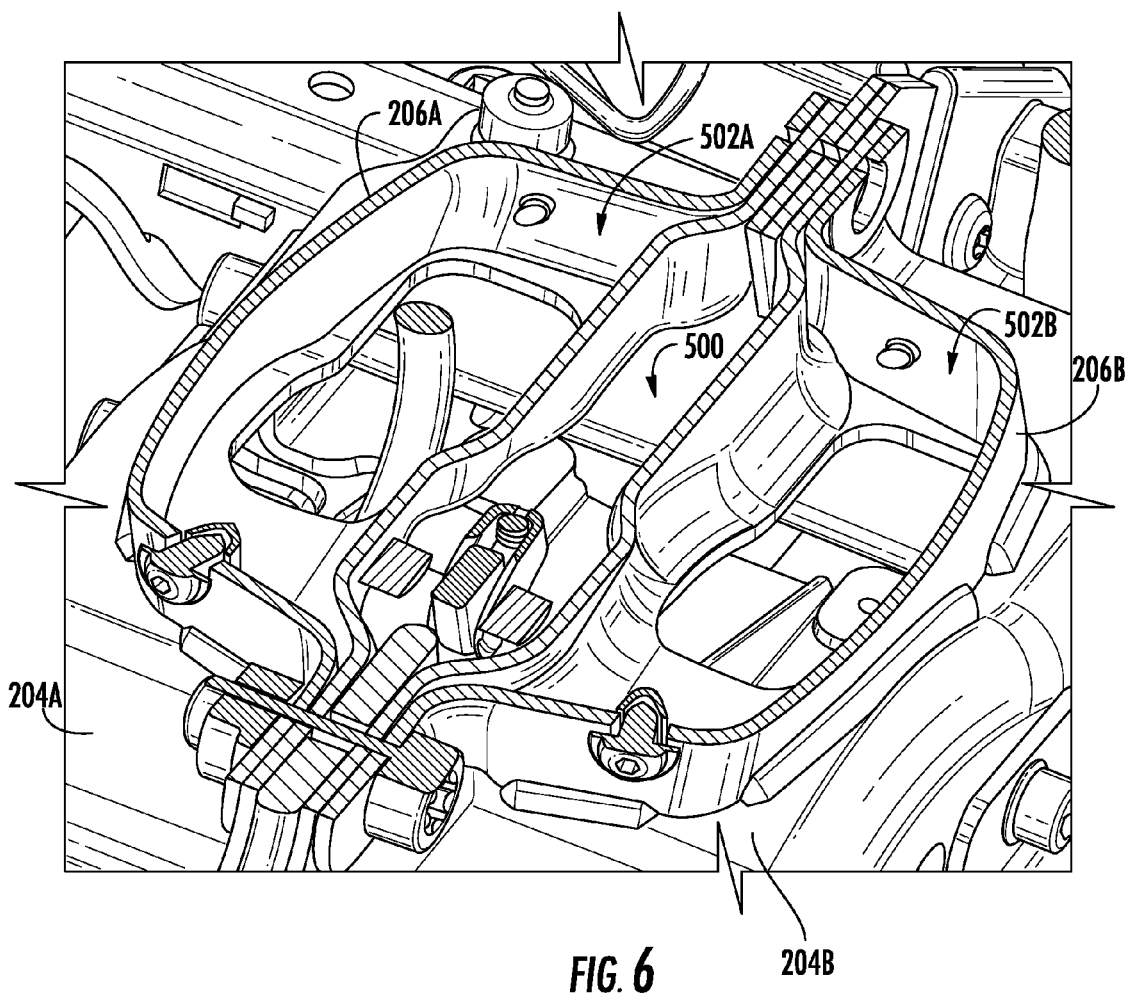
FIG. 6 shows another cross section through the clamshells.

FIG. 6 shows another cross section through the clamshells. This cross section is taken closer to the bottom of the monopost than the previous one. Moreover, this view also shows that the clamshell components 204A-B of the inner subassembly form the load transfer lobe 500, and that the clamshell components 206A-B of the outer subassembly form the load transfer lobes 502A-B. Accordingly, the monopost here has a three-lobe structure substantially all the way to its bottom, to ensure effective transfer of loads on the seat into the vehicle frame. Towards the top, on the other hand, the load transfer lobe 500 here eventually terminates in order to accommodate the pitching and locking mechanism for the seat. In implementations that does not have such a mechanism, however, the central lobe can continue further upward.

Some examples herein describe three lobes being formed within a monopost for load transfer. Other implementations can have more or fewer lobes. For example, more than three lobes can be created by introducing one or more additional subassemblies.

Also, in some examples the respective vertical portions of a monopost are described as subassemblies made from clamshells. In other implementations, however, subassemblies need not be made from clamshells, or the vertical structures are not subassemblies. For example, one hollow elongate structure can be positioned inside another hollow elongate structure so that they form internal lobes. This stacked structure can be provided with a base (e.g., having cross members) for spreading the load outward, and/or keels with catcher plates can be used. Also, at the top a wing member can attach to one or more of the hollow elongate structures to facilitate attachment of a seat frame. Such approaches can be combined with use of certain materials and/or manufacturing processes for the components. In some implementations, aluminum can be used. For example, the material can be extruded to form hollow elongate structures.

Figure 7:
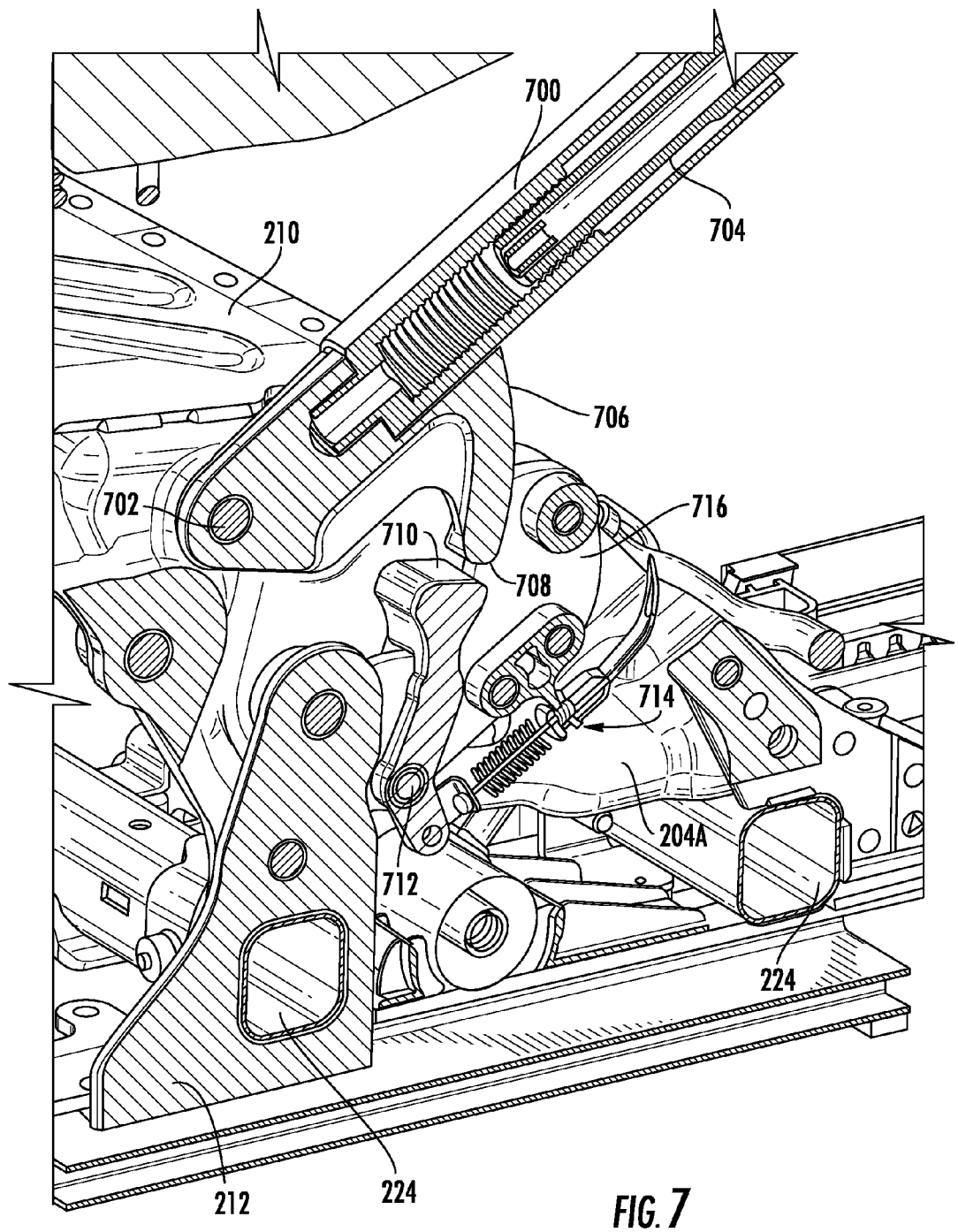
FIG. 7 shows a center cross section through the monopost.

FIG. 7 shows a center cross section through the monopost. This view shows part of the clamshell component 204A from the inside, and the wing portion 210 is also partly visible. Also shown are the keel 212 and the spreaders 224.

The monopost here has a strut 700. The strut is configured for supporting a seat frame (e.g., the frames 102 and 104 in FIG. 1). The strut can be part of a pivot mechanism that facilitates pitching forward of the seat, for example to create additional space in the vehicle (e.g., for ingress and egress). The strut is pivotally attached to the monopost by a bolt 702. The strut can also transfer load from the seat.

The strut has an adjustable length to facilitate pitching the seat forward and rearward. In some implementations, the strut has a lead screw 704 that advances into or out of the strut as it is turned. Accordingly, the strut can be given a specific length that positions the seat at an intended angle of pitch relative to a neutral, or unpitched, position. In some implementations, a rearward pitch of up to a few degrees can be provided, for example as a comfort adjustment for the occupant. In some implementations, a forward pitch of a significant angle (e.g., on the order of tens of degrees) can be provided, for example to accommodate vehicle ingress and egress.

The base of the strut here forms a clevis 706 that has a head 708 for transferring seat loads. The clevis is here positioned near where the strut pivots relative to the monopost. The clevis is configured to bear on a block 710 of the monopost to transfer load into the vehicle. That is, when the downward load of the seat onto the strut increases, such as happens in a crash, the clevis transfers this load into the block and thereby into the rest of the monopost and ultimately into the frame of the vehicle.

The block 710 is pivotally attached at a bolt 712. Moreover, an actuation assembly 714 acts on the block to cause it to assume at least first and second positions. Here, the block is biased by a spring and can be actuated by a cable attached to the block.

For example, in the first position, which is currently shown, the block is situated to meet with the head 708 of the clevis and thereby prevent forward pivoting of the seat frame. As another example, in the second position the block is moved out of the path of the head 708 and therefore does not prevent the clevis (and the rest of the strut) from rotating downward under the load. The block in the second position thereby allows forward pivoting of the seat frame, for example to stow the seat or to make room for entering or exiting the vehicle.

One or more sensors can be used. In some implementations, a sensor detects whether the block 710 is in a lock position such that seat loads can be transferred. For example, this can be done when the vehicle is in drive mode, and when the seat has returned to a normal position after being pivoted forward. Any suitable sensor can be used, including, but not limited to, a micro switch sensor or a Hall sensor.

The block 710 is positioned between substantially parallel plates 716 that are attached to the monopost inside the inner subassembly. Only one of the plates is visible in the current view. For example, these plates allow the block 710 to pivot between its respective positions, and they also serve to transfer the load from the block into the rest of the monopost structure. That is, when the block is positioned so that the head 708 of the clevis bears upon it, the block will transfer the force from the clevis into the respective plates which in turn transfer it into the rest of the monopost through the bolts that they are attached with. By contrast, when the block is moved out of the way to facilitate seat pivoting, this allows the clevis to rotate down between the plates without transferring any load to them.

Another load path can be defined to run through the spreaders 224. In some implementations, the spreader extends through an opening in the keel 212. For example, the spreader can be a single cross member that extends from one track to the other.

In some implementations, however, space accommodation can be accomplished without having a pitch mechanism on the seat. For example, the seatback of a recliner type seat can be inclined fully forward to allow entry and exit. The frame for the seat cushion is then fixed relative to a monopost and a recliner structure is provided for the seatback. That is, in such implementations the seat cushion frame does not pivot relative to the monopost and has no strut.

Figure 8:
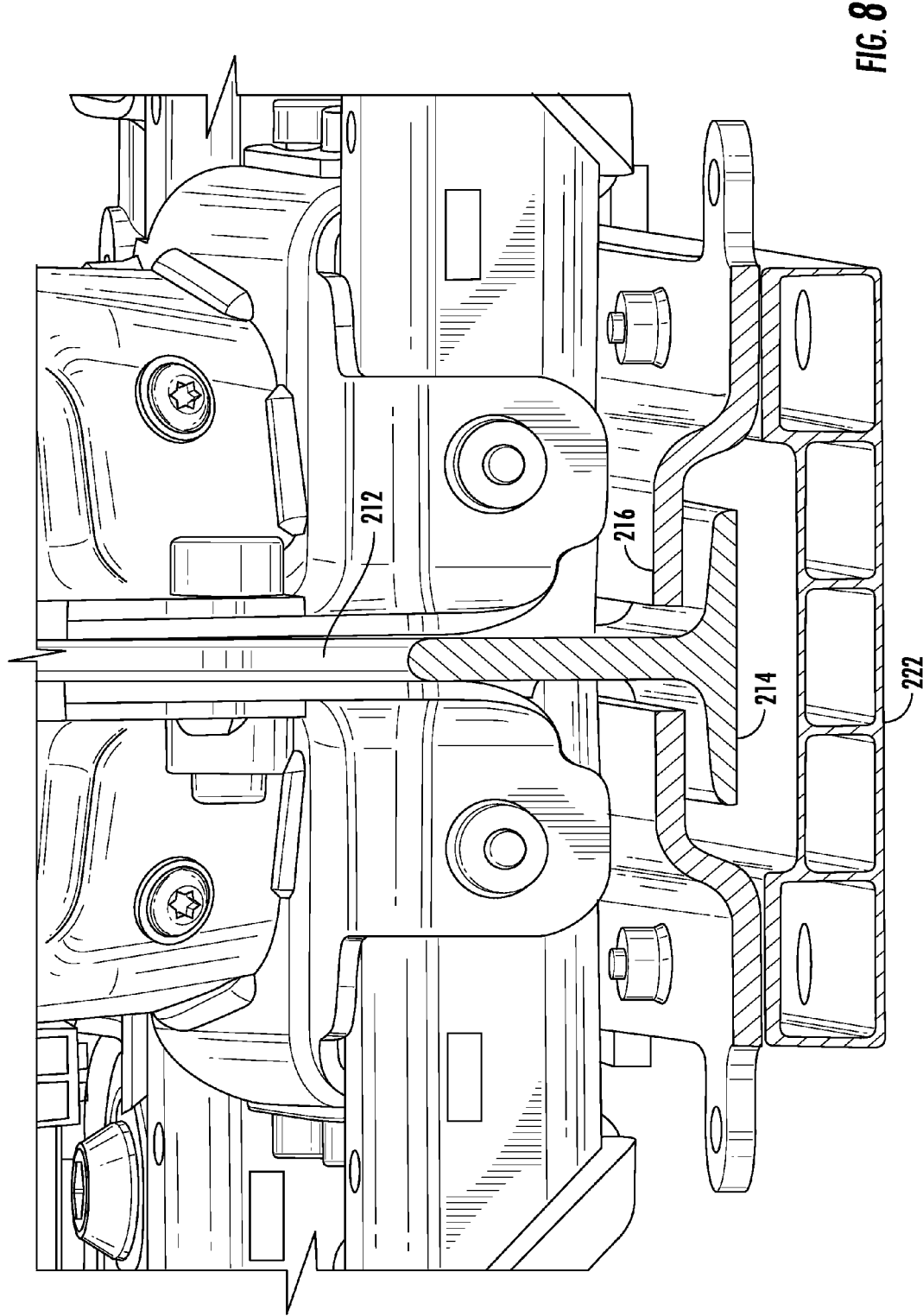
FIG. 8 shows a cross section through the keel.

FIG. 8 shows a cross section through the keel 212. This view shows that the keel has its base 214 underneath the opening in the catcher plate 216. That is, the base is here positioned on an opposite side of the catcher plate from the rest of the monopost (e.g., the inner and outer subassemblies). This arrangement allows the base to bear against the catcher plate and transfer load thereto. For example, the base can form contact surfaces on both sides of the slot in the catcher plate so as to evenly distribute the transferred load. The member 222 can reinforce the catcher plate and increase the bending stiffness thereof.

Figure 9:
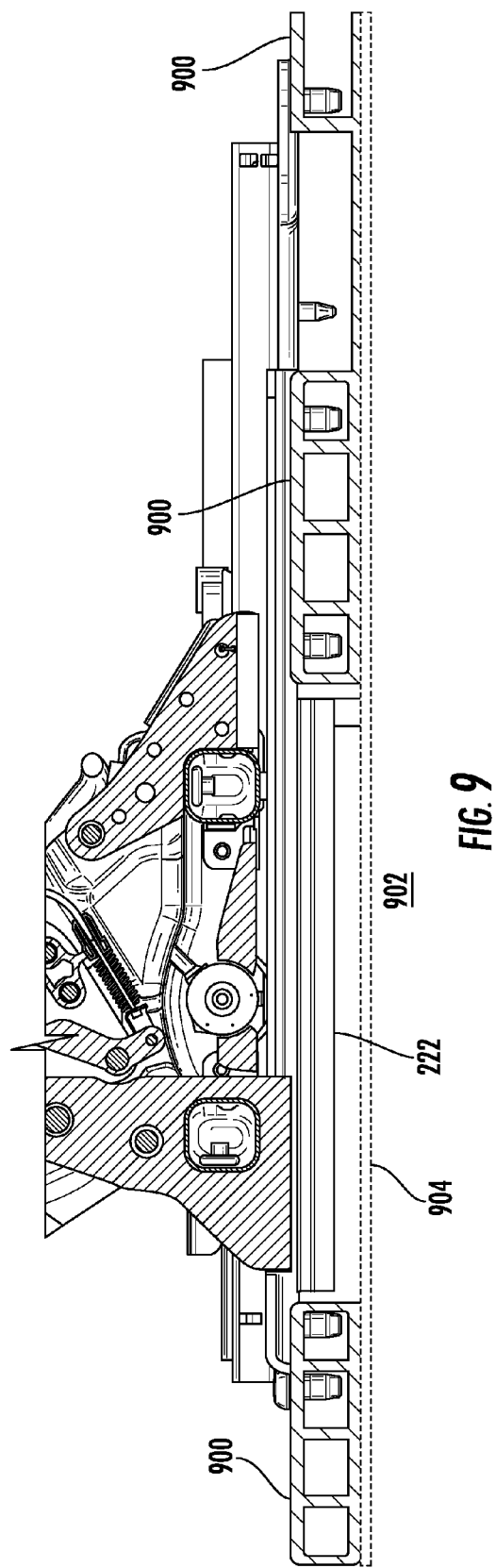
FIG. 9 shows a cross section of the lower seat structure and cross members in a vehicle floor.

FIG. 9 shows a cross section of the lower seat structure and cross members 900 in a vehicle floor. Here, an area 902 is generally occupied by other vehicle components, including, but not limited to, a battery pack for an electric vehicle. The area 902 is defined by a vehicle floor, which is here schematically illustrated by line 904. The cross members 900 (e.g., extruded components) are part of the vehicle's body structure and are positioned along the floor. The catcher plate is bolted to the cross members 900. Moreover, the member 222 is here configured to fit a space between the cross members. For example, when the seat is positioned along the way of the track assembly and a sudden load impact occurs (e.g., a crash), then the member helps the catcher plate transfer the load into the vehicle structure.

The monopost here also has a front keel 906. Here, the keel 906 is positioned at the opposite end of the monopost than the other keel. Similar to the keel 212, the keel 906 is attached to the inner and outer subassemblies and can also serve load transferring purposes. The rear keel is in tension during fore movement of the seat, and the front keel provides a load transfer downward into the floor due to forward rotation.

Figure 10:
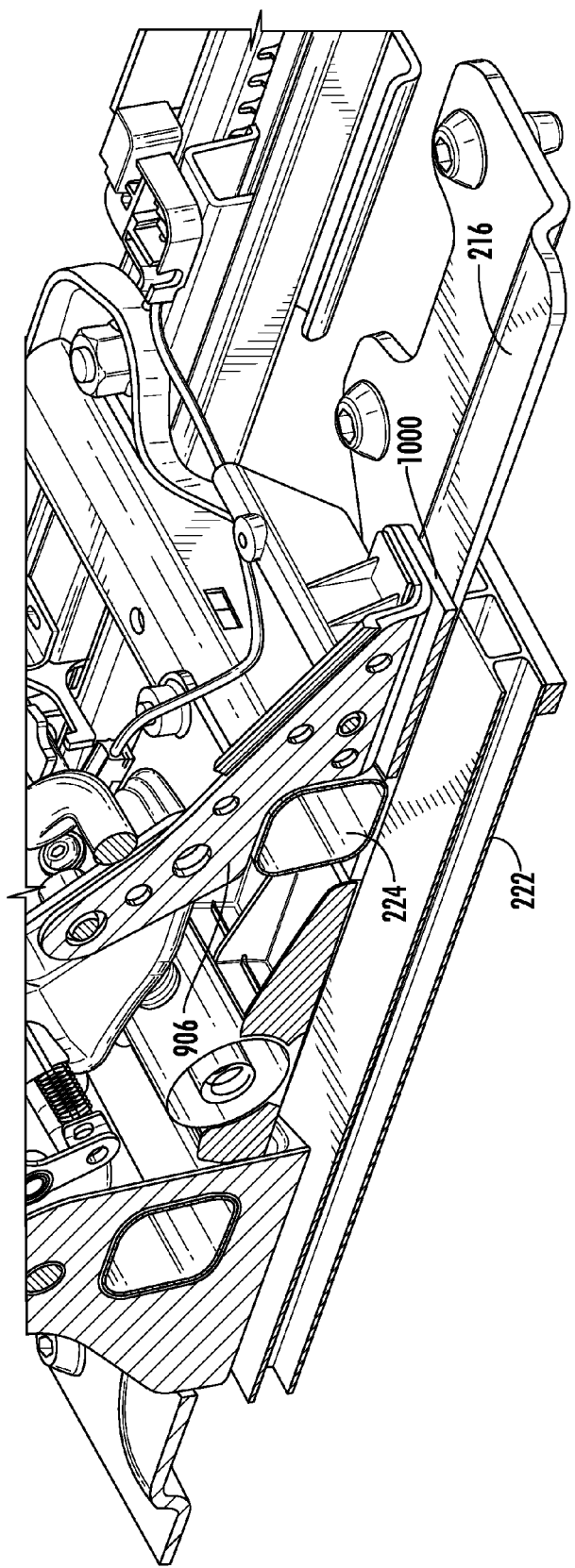
FIG. 10 shows a cross section of the front keel.

FIG. 10 shows a cross section of the front keel 906. The front keel has a base that rests on top of the catcher plate 216 by way of a plate 1000. For example, in the event of a crash, the downward load on the seat and the monopost is transferred into the catcher plate and into the member 222 also by the front keel. Here, the front keel also rests on the spreader 224 positioned at that end of the assembly.

Figure 11:
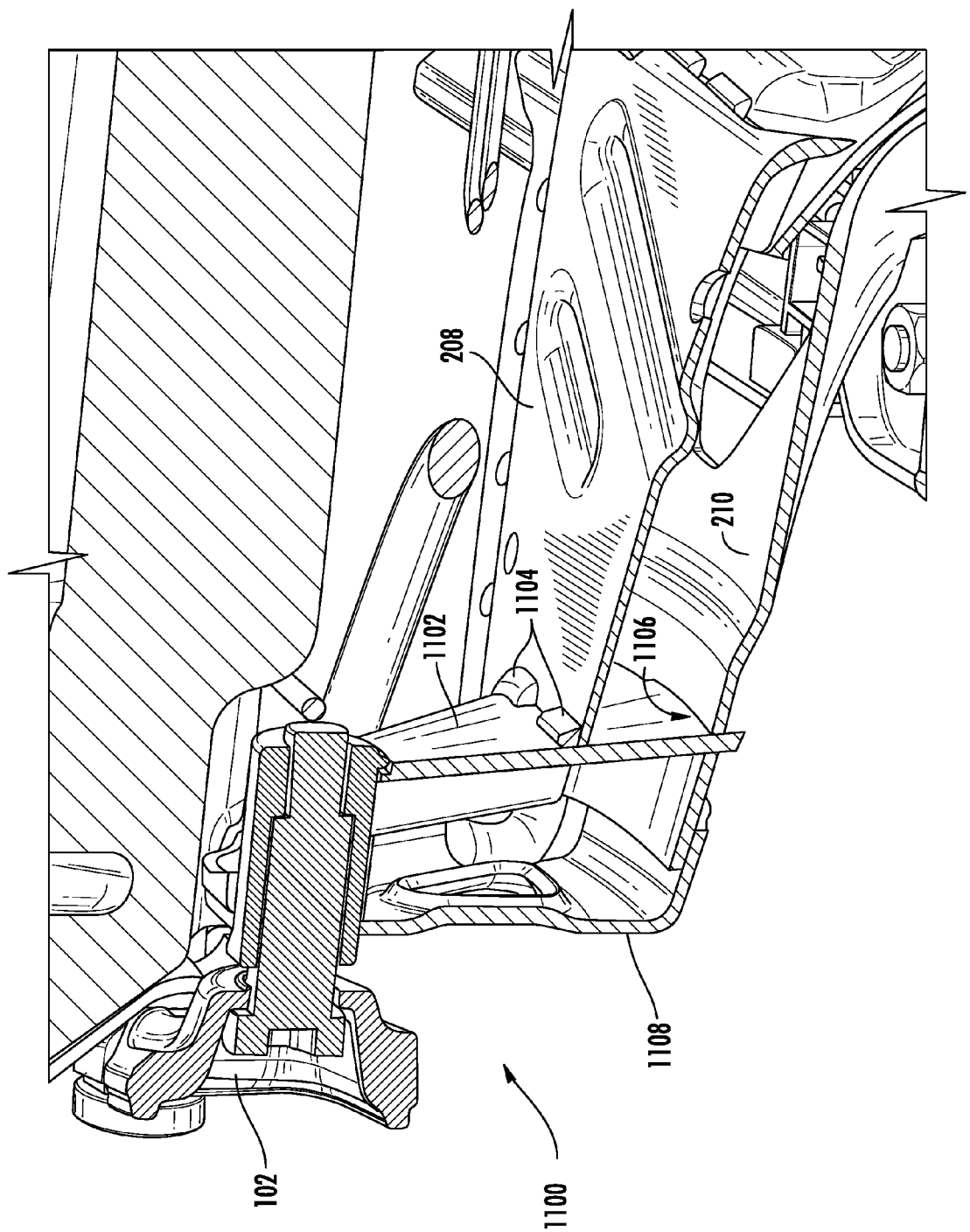
FIG. 11 shows an example of an attachment between the seat frame and the wing.

FIG. 11 shows an example of an attachment 1100 between the seat frame 102 and the wing. That is, the attachment serves to connect the seat frame and the monopost to each other. This view shows that the wing clamshell 208 and the wing portion 210 of the outer subassembly are joined at their outer end—that is, the end away from a center of the monopost—by a tower structure that forms the attachment 1100. The assembly can have towers at respective ends of the wing, and such towers can be configured for attaching the seat frame 102 to the monopost.

The tower here includes a member 1102 that extends from above the wing clamshell 208 and through an opening therein, at which it is attached by a weld 1104. The member continues through the wing, and at least partially extends through an opening 1106 in the wing portion 210, where it can also be attached (e.g., by welding). This arrangement allows for load transfer without entirely depending on the spot welds that attach the wing clamshell 208 to the wing portion 210. Rather, by having the member 1102 go through both clamshells of the wing, one allows more of the material of the tower to transfer the loads, not the welds, by creating a lobe in the tower. The tower also has a member 1108 to be described below. The members can be manufactured using any suitable technique, including, but not limited to, stamping. At the top of the members 1102 and 1108 is a bushing with a marriage bolt that attaches the seat frame to the tower and the monopost.

Figure 12:
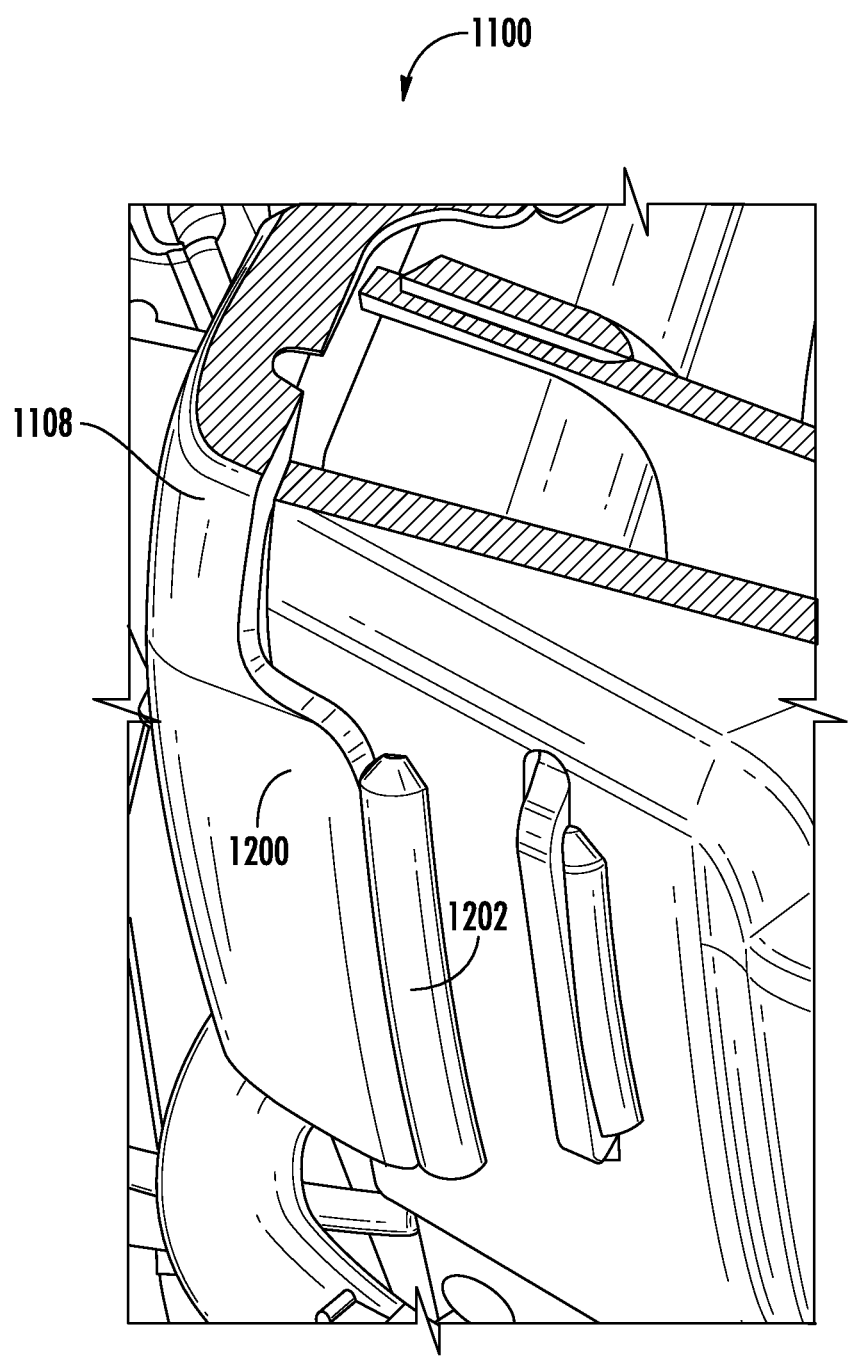
FIG. 12 shows another view of the attachment in FIG. 11.

FIG. 12 shows another view of the attachment 1100 in FIG. 11. This view shows that the member 1108 is attached across an end of the wing. The member 1108 can be welded to the member 1102. Here, the member has a return flange 1200 that is attached on an underside of the wing, such as by a weld 1202.

Figure 13:
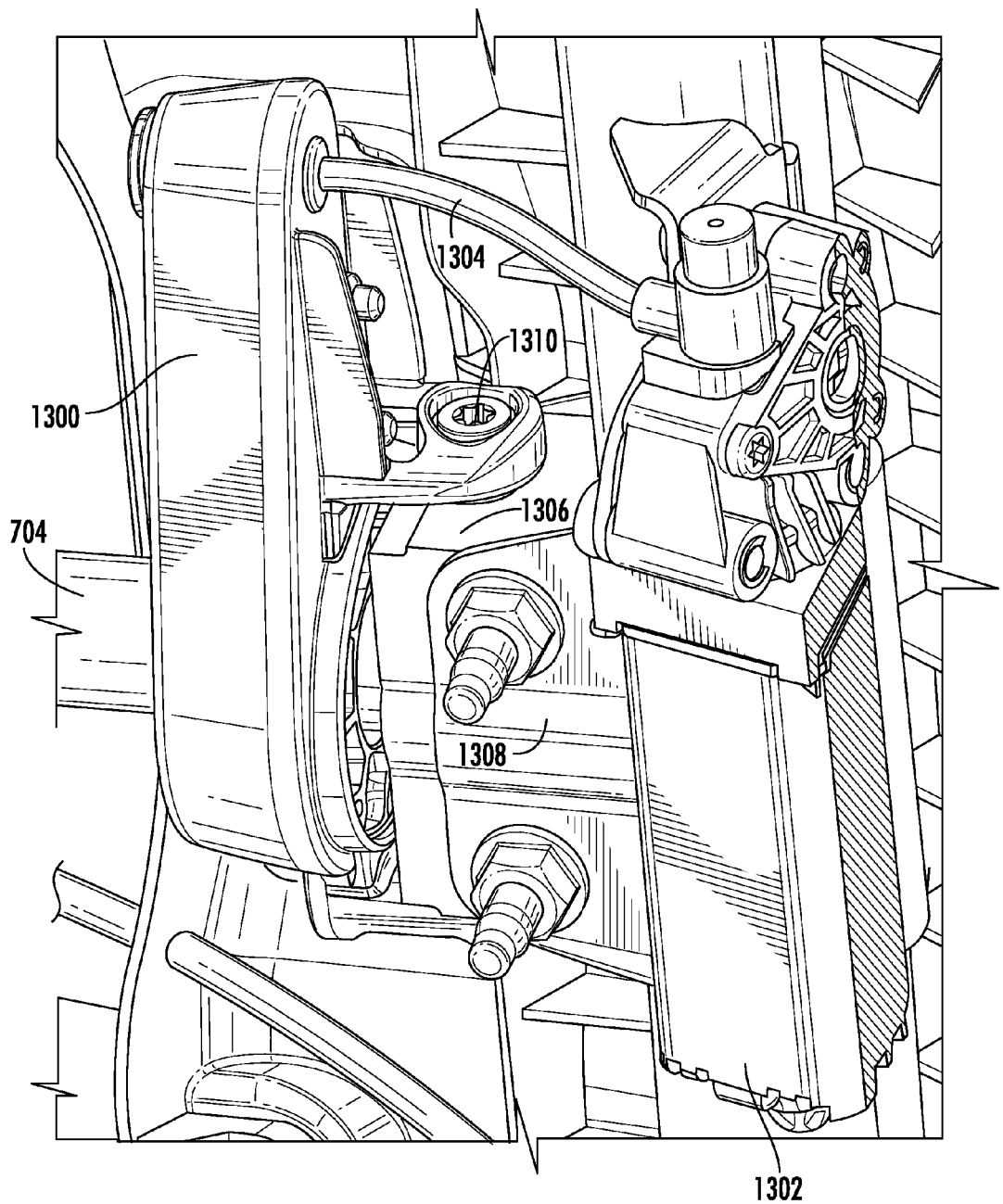
FIG. 13 shows an example of a drive housing and a motor for the lead screw.

FIG. 13 shows an example of a drive housing 1300 and a motor 1302 for the lead screw 704. The drive housing contains the mechanism that rotates the lead screw so as to extend or retract the strut. This mechanism is here driven by the motor by way of a flex shaft 1304. A housing 1306 is attached to the seat frame (e.g., frame 102 in FIG. 1) by one or more brackets 1308. The housing can provide a pivotal attachment at this end of the strut (the other end can also pivot, such as by the bolt 702 in FIG. 7). For example, the drive housing 1300 can pivot by way of an attachment 1310, and/or the lead screw can terminate in a ball bearing inside the housing 1306.

Figure 14:
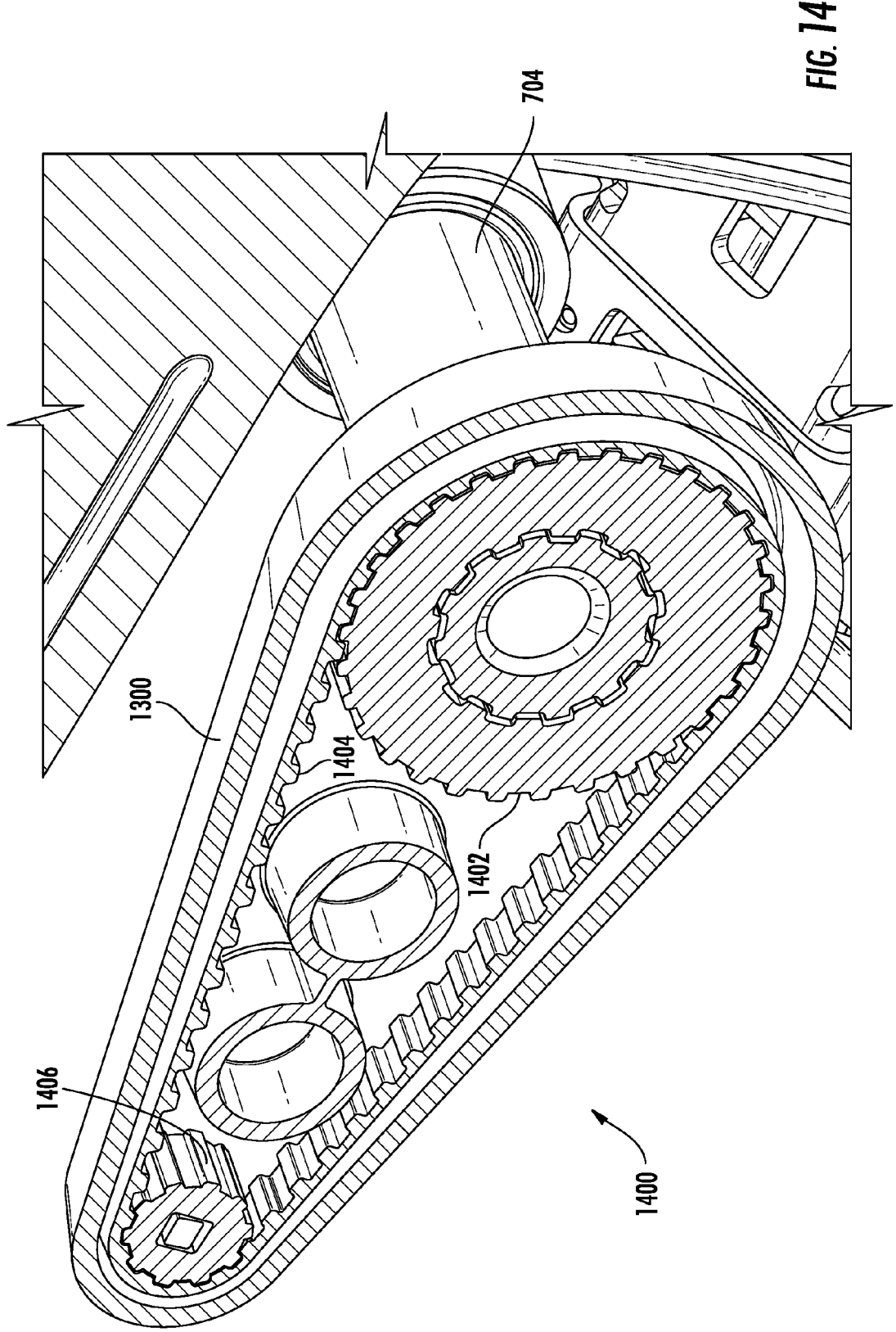
FIG. 14 shows an example of a belt drive in the drive housing.

FIG. 14 shows an example of a belt drive 1400 in the drive housing 1300. The lead screw 704 is here attached to a gear 1402. The gear 1402 is connected by way of a belt 1404 to another gear 1406 which is the drive gear. The drive gear is attached to a shaft from the motor. That is, the drive gear can effectuate rotation of the lead screw in either direction by way of turning the gear 1402 or another large pulley.

Figure 15:
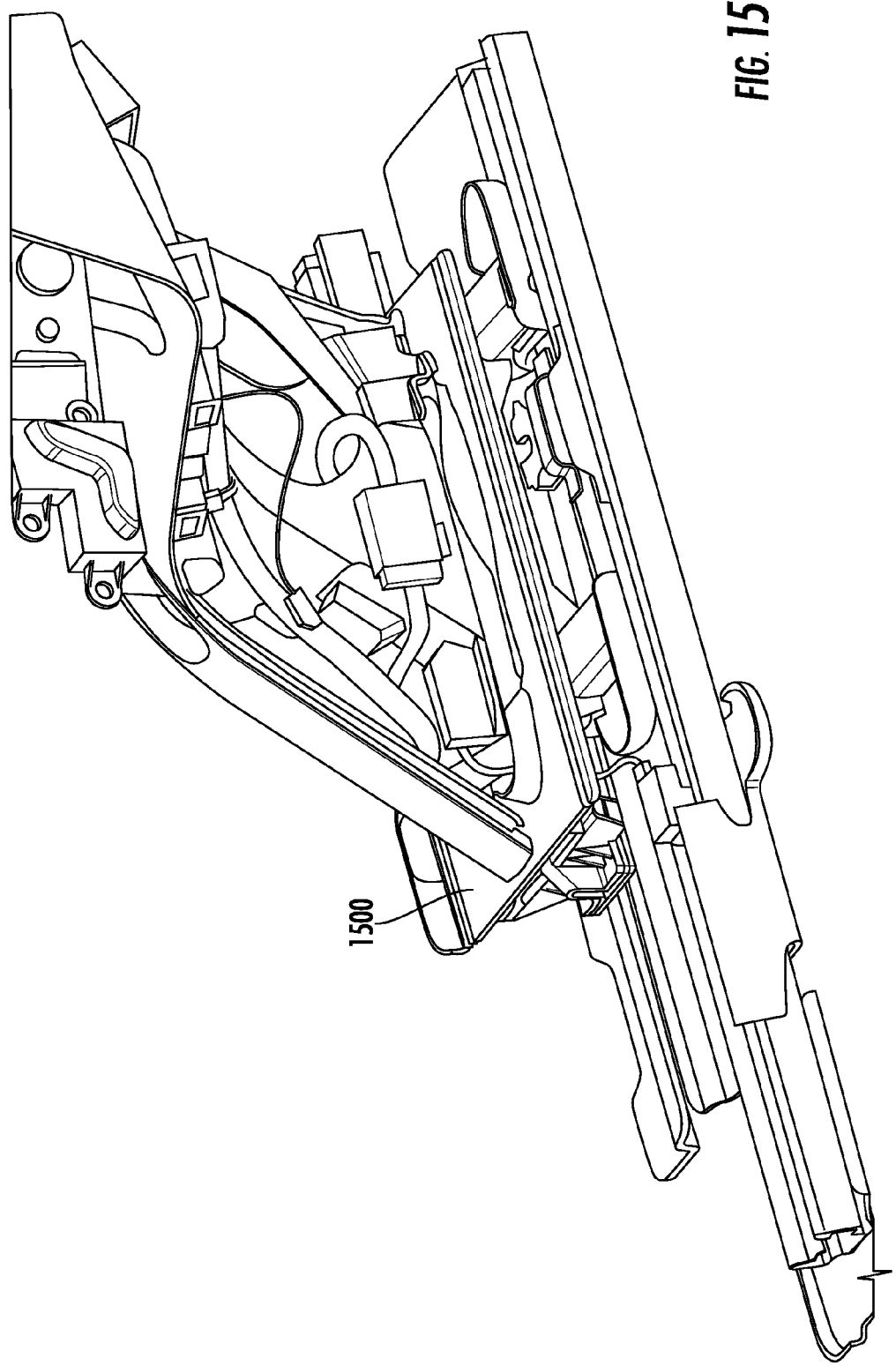
FIG. 15 shows an example of a carrier for a paneling system.

FIG. 15 shows an example of a carrier 1500 for a paneling system. For example, the carrier can be attached directly or indirectly to the monopost so that the carrier travels fore and aft with the rest of the seat. In particular, the paneling system can help cover an opening in a vehicle floor due to different positions of the monopost within that opening.

Figure 16:
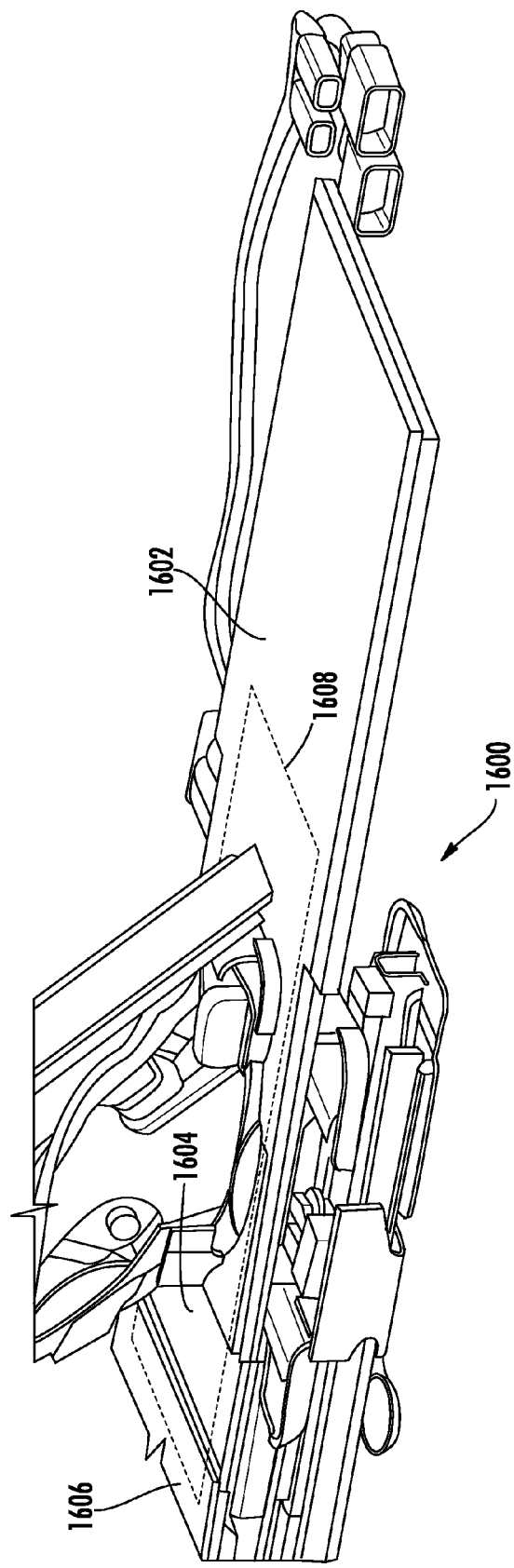
FIG. 16 shows an example of floor paneling.

FIG. 16 shows an example of floor paneling 1600. The floor paneling here includes panels 1602, 1604 and 1606 that are part of a paneling system. The paneling system is configured to at least partially close off an opening in the vehicle floor that is here schematically illustrated by a dashed line 1608. That is, the paneling system can be positioned underneath a vehicle floor surface so that only portions of certain panels are visible through the opening, depending on the position of the seat. Such arrangements can be visually appealing in that they cover the track assembly from occupants' sight, and they can also prevent a person's feet or other obstacles from coming in contact with the track area.

The panels 1602 and 1604 are here attached directly or indirectly to the monopost, for example to the carrier 1500 (FIG. 15). These panels therefore travel fore and aft with the rest of the seat as it moves along the tracks. For example, the seat is currently shown in a foremost position and the panels 1602 and 1604 have traveled there with the seat. The panel 1606, moreover, is also moveable but is not rigidly attached to the monopost. Rather, when the panel 1604 has traveled forward to a certain point, a structure on either of these panels engages the other of them so as to pull the panel 1606 forward. That way, the opening in the vehicle floor remains covered by one or more of the panels 1602-06 for each position of the seat assembly. When the seat is moved rearward in the tracks, at some point the panel 1606 is moved rearward by the movement of another panel and/or the seat. For example, the panel 1604 is pushed underneath the panel 1606 during the reverse motion, and when the rear edge of the panel 1602 reaches the front edge of the panel 1606, this causes the panel 1606 to be moved rearward.

A number of implementations have been described as examples. Nevertheless, other implementations are covered by the following claims.

What is claimed is:

1. A structure comprising:
   a track assembly;
   a monopost including;
     an outer subassembly that includes a wing portion;
     an inner subassembly having a flange at a top thereof; and
     a wing member that attaches to the wing portion with the flange sandwiched between the wing member and the wing portion;
     wherein the inner subassembly includes a substantially vertical portion and includes a substantially horizontal portion extending outward at a lower end of the substantially vertical portion;
     wherein the substantially vertical portion extends up inside the outer subassembly;
     wherein a lower end of the outer subassembly is connected to the substantially horizontal portion of the inner subassembly; and
     wherein the wing member is attached to the inner subassembly and the outer subassembly;
   a spreader frame connecting the monopost to the track assembly; and
   a rear keel attached to the monopost.

2. The structure of claim 1, wherein the track assembly includes a pair of seat tracks.

3. A structure comprising:
   a track assembly;
   a monopost including;
     an outer subassembly;
     an inner subassembly; and
     a wing member;
     wherein the inner subassembly includes a substantially vertical portion and includes a substantially horizontal portion extending outward at a lower end of the substantially vertical portion;
     wherein the substantially vertical portion extends up inside the outer subassembly;
     wherein a lower end of the outer subassembly is connected to the substantially horizontal portion of the inner subassembly; and
     wherein the wing member is attached to the inner subassembly and the outer subassembly;
   a spreader frame connecting the monopost to the track assembly;
   a rear keel attached to the monopost; and
   a catcher plate having a slot defined therein and a base attached to the rear keel, wherein the rear keel extends through the slot such that the base is on an opposite side of the catcher plate from the monopost.

4. The structure of claim 3, wherein the catcher plate is connected to cross members.

5. The structure of claim 4, further comprising a structural member situated between the cross members wherein the catcher plate is connected to the structural member.

6. The structure of claim 1, wherein the spreader frame includes spreaders.

7. The structure of claim 6, wherein the spreaders include feet that fit onto the track assembly.

8. The structure of claim 6, wherein the inner subassembly is attached to the spreaders.

9. A structure comprising:
   a track assembly;
   a monopost including;
     an outer subassembly;
     an inner subassembly, wherein the inner subassembly defines a first lobe within the inner subassembly and wherein the outer subassembly defines a second lobe and a third lobe between the outer subassembly and the inner subassembly; and
     a wing member;
     wherein the inner subassembly includes a substantially vertical portion and includes a substantially horizontal portion extending outward at a lower end of the substantially vertical portion;
     wherein the substantially vertical portion extends up inside the outer subassembly;
     wherein a lower end of the outer subassembly is connected to the substantially horizontal portion of the inner subassembly; and
     wherein the wing member is attached to the inner subassembly and the outer subassembly;
   a spreader frame connecting the monopost to the track assembly; and
   a rear keel attached to the monopost.

10. A structure comprising:
    a track assembly;
    a monopost including;
      an outer subassembly;
      an inner subassembly; and
      a wing member;

wherein the inner subassembly includes a substantially vertical portion and includes a substantially horizontal portion extending outward at a lower end of the substantially vertical portion;
wherein the substantially vertical portion extends up inside the outer subassembly;
wherein a lower end of the outer subassembly is connected to the substantially horizontal portion of the inner subassembly; and
wherein the wing member is attached to the inner subassembly and the outer subassembly;
a spreader frame connecting the monopost to the track assembly; and
a rear keel attached to the monopost by a bolt passing through the outer subassembly, the inner subassembly and the rear keel.

11. A structure comprising:
a track assembly;
a monopost including;
an outer subassembly;
an inner subassembly having first clamshells; and
a wing member;
wherein the inner subassembly includes a substantially vertical portion and includes a substantially horizontal portion extending outward at a lower end of the substantially vertical portion;
wherein the substantially vertical portion extends up inside the outer subassembly;
wherein a lower end of the outer subassembly is connected to the substantially horizontal portion of the inner subassembly; and
wherein the wing member is attached to the inner subassembly and the outer subassembly;
a spreader frame connecting the monopost to the track assembly; and
a rear keel attached to the monopost.

12. A structure comprising:
a track assembly;
a monopost including;
an outer subassembly having second clam shells;
an inner subassembly; and
a wing member;
wherein the inner subassembly includes a substantially vertical portion and includes a substantially horizontal portion extending outward at a lower end of the substantially vertical portion;
wherein the substantially vertical portion extends up inside the outer subassembly;
wherein a lower end of the outer subassembly is connected to the substantially horizontal portion of the inner subassembly; and
wherein the wing member is attached to the inner subassembly and the outer subassembly;
a spreader frame connecting the monopost to the track assembly; and
a rear keel attached to the monopost.

13. A structure comprising:
a track assembly;
a monopost including;
an outer subassembly;
an inner subassembly; and
a wing member;
wherein the inner subassembly includes a substantially vertical portion and includes a substantially horizontal portion extending outward at a lower end of the substantially vertical portion;
wherein the substantially vertical portion extends up inside the outer subassembly;
wherein a lower end of the outer subassembly is connected to the substantially horizontal portion of the inner subassembly; and
wherein the wing member is attached to the inner subassembly and the outer subassembly;
a strut connected to the monopost;
a spreader frame connecting the monopost to the track assembly; and
a rear keel attached to the monopost.

14. The structure of claim 13, wherein a clevis is formed at a base of the strut.

15. A structure comprising:
a track assembly;
a monopost including;
an outer subassembly;
an inner subassembly;
a block pivotally attached thereto; and
a wing member;
wherein the inner subassembly includes a substantially vertical portion and includes a substantially horizontal portion extending outward at a lower end of the substantially vertical portion;
wherein the substantially vertical portion extends up inside the outer subassembly;
wherein a lower end of the outer subassembly is connected to the substantially horizontal portion of the inner subassembly; and
wherein the wing member is attached to the inner subassembly and the outer subassembly;
a spreader frame connecting the monopost to the track assembly; and
a rear keel attached to the monopost.

16. The structure of claim 15, further comprising an actuation assembly connected to the block.

17. A structure comprising:
a track assembly;
a monopost including;
an outer subassembly;
an inner subassembly;
a wing member;
wherein the inner subassembly includes a substantially vertical portion and includes a substantially horizontal portion extending outward at a lower end of the substantially vertical portion;
wherein the substantially vertical portion extends up inside the outer subassembly;
wherein a lower end of the outer subassembly is connected to the substantially horizontal portion of the inner subassembly; and
wherein the wing member is attached to the inner subassembly and the outer subassembly;
a spreader frame connecting the monopost to the track assembly;
a rear keel attached to the monopost; and
parallel plates attached to the monopost inside the inner subassembly.

18. A structure comprising:
a track assembly;
a monopost including;
an outer subassembly;
an inner subassembly;
a wing member;
wherein the inner subassembly includes a substantially vertical portion and includes a substantially horizontal portion extending outward at a lower end of the substantially vertical portion;
wherein the substantially vertical portion extends up inside the outer subassembly;
wherein a lower end of the outer subassembly is connected to the substantially horizontal portion of the inner subassembly; and
wherein the wing member is attached to the inner subassembly and the outer subassembly;
a rear keel attached to the monopost; and
a spreader frame connecting the monopost to the track assembly that includes spreaders and wherein one of the spreaders extends through an opening in the rear keel.

19. A structure comprising:
a track assembly;
a monopost including:
an outer subassembly;
an inner subassembly;
a wing member;
wherein the inner subassembly includes a substantially vertical portion and includes a substantially horizontal portion extending outward at a lower end of the substantially vertical portion;
wherein the substantially vertical portion extends up inside the outer subassembly;
wherein a lower end of the outer subassembly is connected to the substantially horizontal portion of the inner subassembly; and
wherein the wing member is attached to the inner subassembly and the outer subassembly;
a spreader frame connecting the monopost to the track assembly;
a front keel connected to the inner subassembly and the outer subassembly; and
a rear keel attached to the monopost.

20. The structure of claim 19, wherein the spreader frame includes spreaders and wherein the front keel rests on one of the spreaders.

21. A structure comprising:
a track assembly;
a monopost including;
a wing member;
an outer subassembly including a wing portion, wherein the wing portion is attached to the wing member;
a tower structure connected to the wing portion and connected to the wing member;
an inner subassembly;
wherein the inner subassembly includes a substantially vertical portion and includes a substantially horizontal portion extending outward at a lower end of the substantially vertical portion;
wherein the substantially vertical portion extends up inside the outer subassembly;
wherein a lower end of the outer subassembly is connected to the substantially horizontal portion of the inner subassembly; and
wherein the wing member is attached to the inner subassembly and the outer subassembly;
a spreader frame connecting the monopost to the track assembly; and
a rear keel attached to the monopost.

22. The structure of claim 21, wherein the tower structure extends through a first opening defined in the wing member and is connected to the wing.

23. The structure of claim 22, wherein the tower structure further extends through a second opening defined in the wing portion.

24. The structure of claim 21, wherein the tower structure includes a member having a return flange and wherein the return flange is attached to an underside of the wing member.

* * * * *